US008678744B2

(12) United States Patent
Seymour

(10) Patent No.: US 8,678,744 B2
(45) Date of Patent: Mar. 25, 2014

(54) HYDRO TORQUE ELECTRIC GENERATOR

(76) Inventor: Eugene George Seymour, Rooseveltown, NY (US)

(*) Notice: Subject to any disclaimer, the term of this patent is extended or adjusted under 35 U.S.C. 154(b) by 398 days.

(21) Appl. No.: 12/459,972

(22) Filed: Jul. 10, 2009

(65) Prior Publication Data

US 2011/0006533 A1 Jan. 13, 2011

(51) Int. Cl.
*F03B 13/12* (2006.01)
(52) U.S. Cl.
USPC ............................................................. 415/3.1
(58) Field of Classification Search
USPC ............................................................. 415/3.1
See application file for complete search history.

(56) References Cited

U.S. PATENT DOCUMENTS

| 963,241 | A | * | 7/1910 | Nobis | 415/24 |
| 965,108 | A | * | 7/1910 | Hesse | 416/112 |
| 1,365,971 | A | * | 1/1921 | Thieden | 235/131 R |
| 6,109,863 | A | * | 8/2000 | Milliken | 415/1 |

* cited by examiner

*Primary Examiner* — Dwayne J White

(57) ABSTRACT

An apparatus that is mounted above a water current flow for generating electricity. The apparatus is oriented perpendicular to the direction of the water current flow with paddles protruding from a shaft into the water causing the shaft to rotate. Component parts mounted on three parallel shafts interconnected by gears transfer the rotational motion energy through the apparatus amplifying the velocity and storing torque in a flywheel. Each shaft has a disconnect mechanism to transfer the motion from the shaft outer end to the inner end allowing for a specific installation method that moves the motion from the point of contact with the water current flow through the apparatus to an electric generator, generating electricity.

2 Claims, 7 Drawing Sheets

SECTION A: DRIVE SHAFT - END VIEW

TRANSFER SYSTEM - PLAN VIEW

Section C: Fig. 5
FLYWHEEL - PLAN VIEW
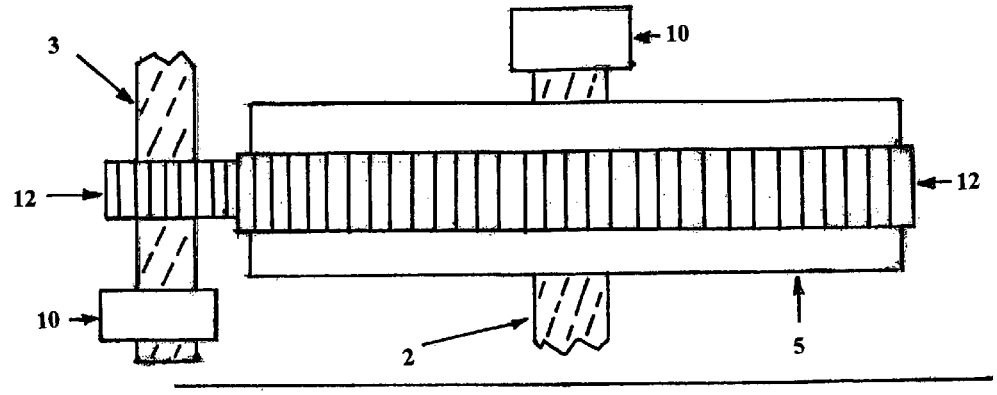
Section C: FLYWHEEL - END VIEW
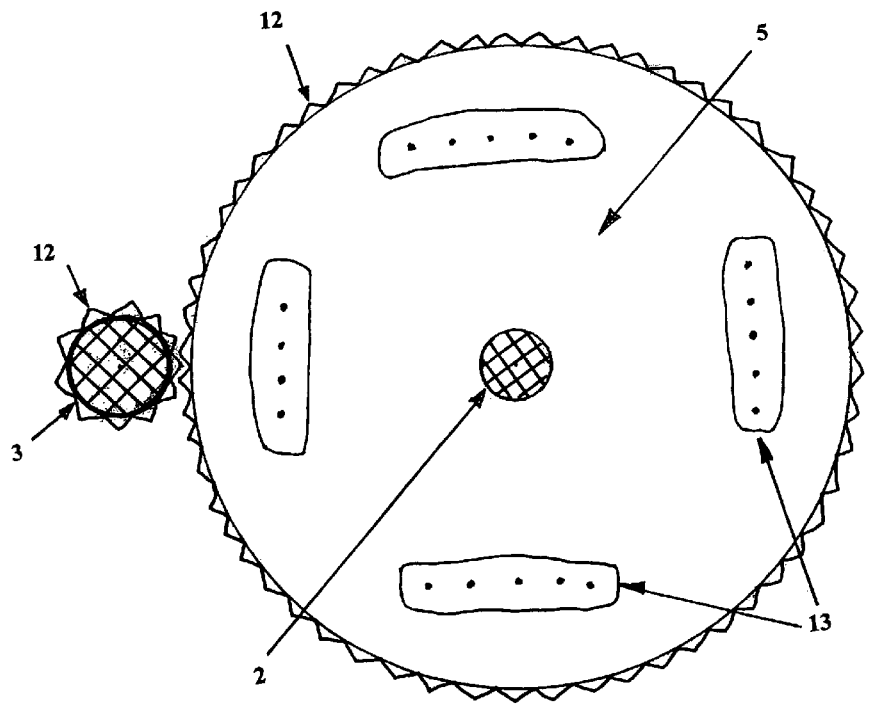

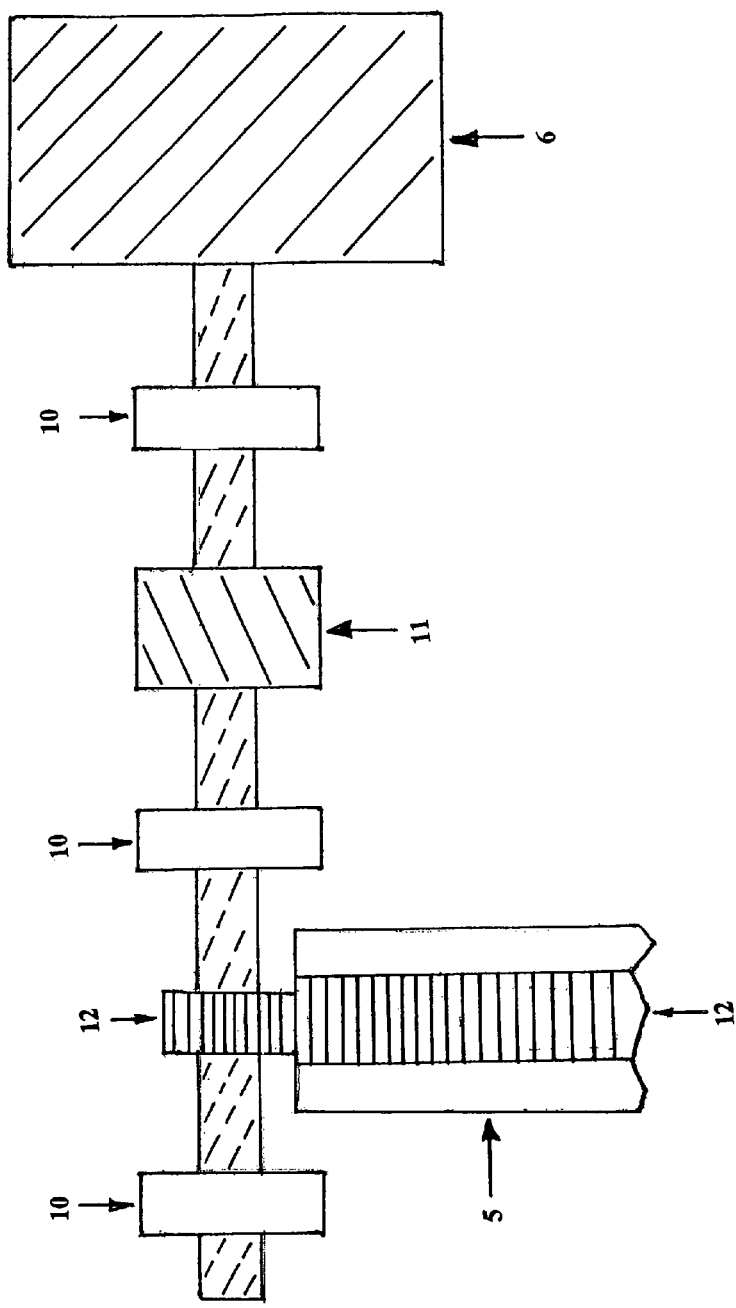

HYDRO Torque Electric Generator
(CONCEPTUAL DIAGRAM)

US 8,678,744 B2

HYDRO TORQUE ELECTRIC GENERATOR

CROSS-REFERENCE TO RELATED APPLICATIONS

This application is based on Provisional Patent Application No. 61/134,608, filed on Jul. 11, 2008 and the Applicant claims priority rights back to the date of filing of Jul. 11, 2008.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION (1) Field of Invention, (Technical Field)

The present invention relates, in general, to a water power electric generator apparatus to harness the energy of a water current flow and to the specific sequential methodology required for the engagement of the apparatus' component parts.

(2) Description of Related Art, (Background Art)

About Conventional Water Power Energy Production in General

For decades now water power electric generation has come from the energy created when water falls from a water reservoir made by a dam on a water flow. This standard form of water power generation is referred to as "Conventional Water Power".

Water is heavy, weighing 62.42796 pounds per cubic foot. With "Conventional Water Power Electric Generation" electricity is produced by water falling from a water reservoir into an electrical generator to produce electricity. It is the mass of the water times the height of the fall, (the difference in elevation), that produces the electric power.

In 1878 the world's first hydroelectric power scheme was developed at Cragside in Northumberland, England by William George Armstrong. It was used to power a single light bulb in his art gallery. The old Schoelkop Power Station No. 1 near Niagara Falls in the U.S. side began to produce electricity with the conventional water power generation of a water reservoir falling water into an electrical generator to produce electricity in 1881. The first Edison hydroelectric power plant, the Vulcan Street Plant, began operating Sep. 30, 1882 in Appleton, Wis., with an out put of about 12.5 kilowatts. By 1886 there were 45 hydroelectric power plants in the US and Canada. By 1889, there were 200 in the US alone. For decades since, the water power energy sector used only this "Conventional Water Power" dam form of electric energy production.

It was thought that this conventional water power form of electrical production was the only manner in which water power could be generated until recently, (2000), that the hydro kinetic devise of a submersible turbine was introduced.

About All Sources of Electrical Energy Supply in General

The supply of electrical power today, in the year of 2012, is produced in multiple ways. Major electrical energy production, such as, Nuclear Power and Coal Generation require an energy input source to produce the electrical power output. Nuclear Power requires mining extraction of uranium and refining the uranium into fuel rods which then are use to heat water into steam. Coal Power Generation requires coal mining extraction and burning of the coal to heat water into steam. Conventional Water Power dams require the construction of the dam to create a water reservoir to produce electric power. All these forms of major electrical energy production are a continuous flow of electrical power.

About Alternative Energy Production in General

Alternative energy production utilizes natural energy input supplies, such as solar energy production uses sun light to produce electrical output, wind energy production uses the natural blowing of the wind to turn wind turbines and hydro kinetic devices uses the natural water current flows and ocean wave action to produce electrical power. Solar and wind electrical power generation are not continuous but rather are pulsating electrical energy production, for; when the sun goes down the lights go out if electrically supplied by solar energy power and when the wind stops blowing the wind turbine stops turning producing no electrical out put.

Hydro Kinetic electrical energy is produced from the natural flow of water and for the most part is continuous electric power generation.

About Hydro Kinetic Energy Developments Specifically

In the alternative energy water power field today, in the year 2012, all apparatus placed in water to generate electricity are referred to as; "Hydro Kinetic Devices".

In ocean waters, apparatus place in the water for the purposes of generating electricity are referred to as "Marine Hydro Kinetic Devices".

In current water flows apparatus placed in the water are referred to as "Hydro Kinetic Devises". Of these devises, most notable today, in the year 2012, is the "Submersible Hydro Kinetic Devise", (US Patent Document no.: U.S. Pat. No. 6,109,863, date: August 2000, name: Milliken, Larry D.). It is a submersible turbine that is mounted on the water current flow bottom. It has a rotating prop perpendicular to the water flow and it's power drive shaft is oriented parallel to the direction of the water current flow.

The Hydro Torque Electric Generator is an apparatus mounted above the water and with a power drive shaft oriented perpendicular to the water current flow with paddles protruding into the surface of the water 1½ to 2 feet. As such, the apparatus is environmentally friendly, an issue that needs to be address when installing mechanisms into a water current flow.

BRIEF SUMMARY OF THE INVENTION

The apparatus generates electricity by capturing the linear motion energy of a water current flow in the form of rotational motion energy.

The apparatus is mounted above a water current flow for generating electricity. The outer end of a power drive shaft (1) is mounted perpendicular to the direction of the water current flow above the water with paddles (7) extended from the shaft (1) protruding into the water. The apparatus captures the linear motion energy of the water current flow in the form of rotational motion energy on the outer end of rotating power drive shaft (1). The rotational motion energy captured by the paddles (7) on the power drive shaft (1) is then transferred through component parts of the apparatus in a specific sequential manner starting from the outer end of the power drive shaft (1) through components on three parallel shafts to a electric generator (6), generating electricity, on the inner end of a power take off shaft (3).

The three parallel shafts of the apparatus consists of a power drive shaft (1) with paddles (7) mounted on paddle arms (8) on the outer end, a clutch (11) in the middle and on the inner end an inter connecting gear (12) to a gear (12) on the outer end of a flywheel shaft (2). The flywheel shaft (2) has an inter connecting gear (12) on the outer end to the gear (12) on the inner end of power drive shaft (1), a transmission (4) in the middle and a flywheel (5) on the inner end with perimeter gears (12) inter connected to a gear (12) on the outer end of a power take off shaft (3). The power take off shaft (3) has an outer end inter connected gear (12) to the flywheel perimeter gears (12) on the flywheel (5), a clutch (11) in the middle and a electric generator (6) on the inner end.

The inter connecting shaft gears (12) amplify the rotational motion. The length of the paddle arms (8) on the outer end of the power drive shaft (1) amplifies the torque of the rotation motion. The flywheel (5) stores torque captured from the linear motion of the water current flow. The transmission (4) incrementally transfers the rotational motion to the flywheel (5) establishing momentum of the rotational motion which stores torque captured from the water current flow. The flywheel perimeter gears (12) transfers the rotational motion energy of the stored torque with amplified velocity to an electric generator (6), generating electricity.

The apparatus operates with a rotational motion transfer system that is engaged upon installation in a specific sequential manner. All three rotation shafts, the power drive shaft (1), the flywheel shaft (2), and the power take off shaft (3) have disconnect points in the middle to allow for the rotational motion to be sequentially transferred from the outer end to the inner end of each shaft. The rotational motion initially created on the outer end of the power drive shaft (1) by the capture of the linear motion of the water current flow by the shaft paddles (7) is transferred to the inner end of the shaft (1) by a clutch (11). Rotational motion on the outer end of the flywheel shaft (2) created by the inter connected gear (12) to a gear (12) on the inner end of the power drive shaft (1) is then incrementally transferred to the inner end by a transmission (4) creating rotational motion of the flywheel (5) with perimeter gears (12) inter connected to a gear (12) on the power take off shaft (3) outer end. The rotational motion created on the outer end of the power take off shaft (3) is then transferred by a clutch (11) from the shaft (3) outer end to the inner end into an electric generator (4), generating electricity.

Figure 1:
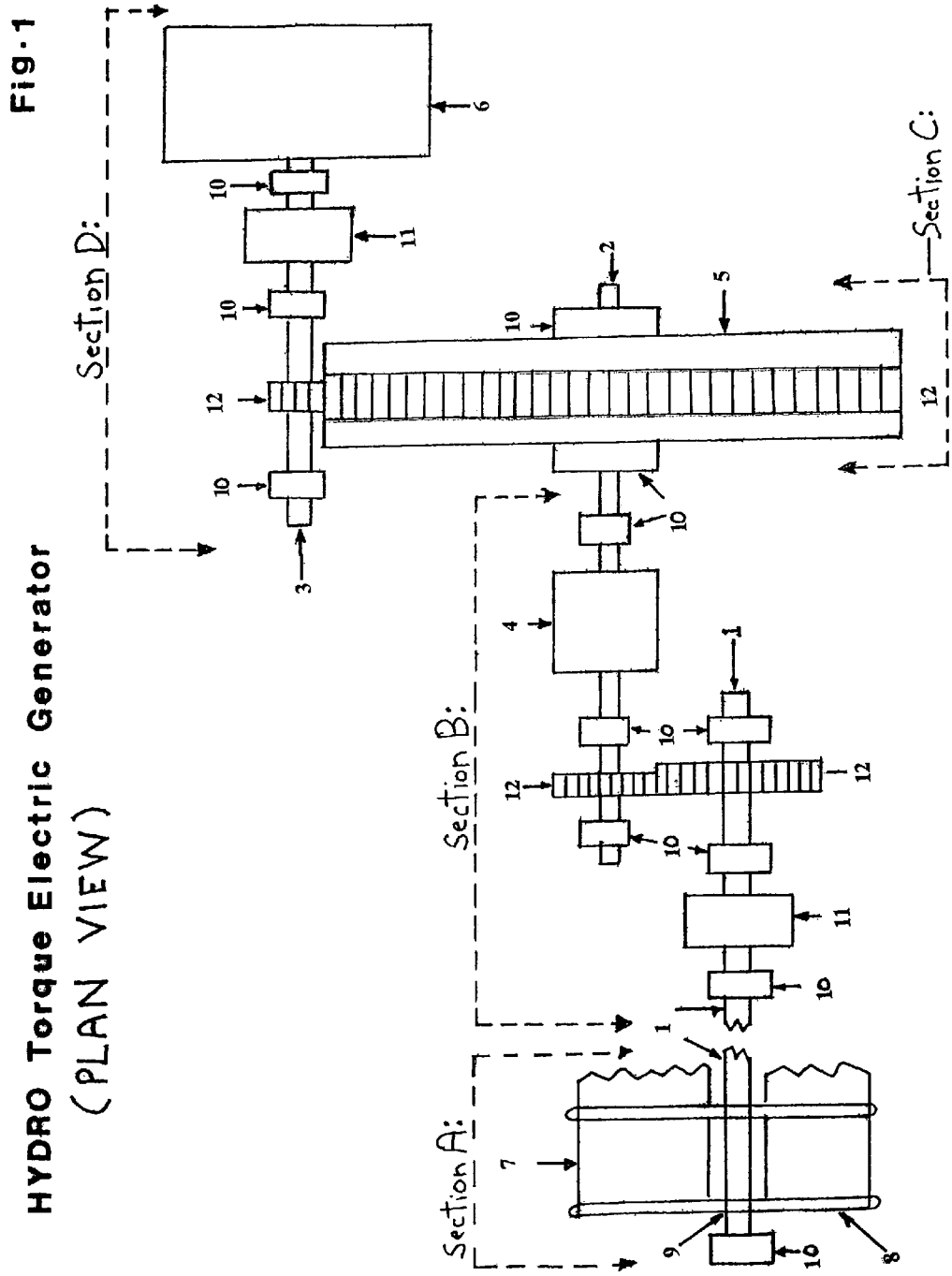
FIG. 1:—Title: "Hydro Torque Electric Generator—Plan View"

Description:—is a plan view of the entire apparatus of the Hydro Torque Electric Generator outlining section drawings of; Section A—power drive shaft (1) (end view & side view);
Section B—Transfer System—plan view;
Section C—Flywheel (5); plan view & end view; and,
Section D—Power Take Off Shaft (3)-plan view.
it shows the 3 parallel shafts of; a power drive shaft (1), a flywheel shaft (2) and a power take off shaft (3) with inter connected gears (12).
it shows the shafts disconnect points on each of the 3 shafts of: a clutch (11) on the power drive shaft (1), a transmission (4) on the flywheel shaft (2) and a clutch (11) on the power take off shaft (3).
it shows paddles (7) on the outer end of the power drive shaft (1), a flywheel (5) on the inner end of the flywheel shaft (2) and a electric generator (6) on the inner end of the power take off shaft (3).

Figure 2:
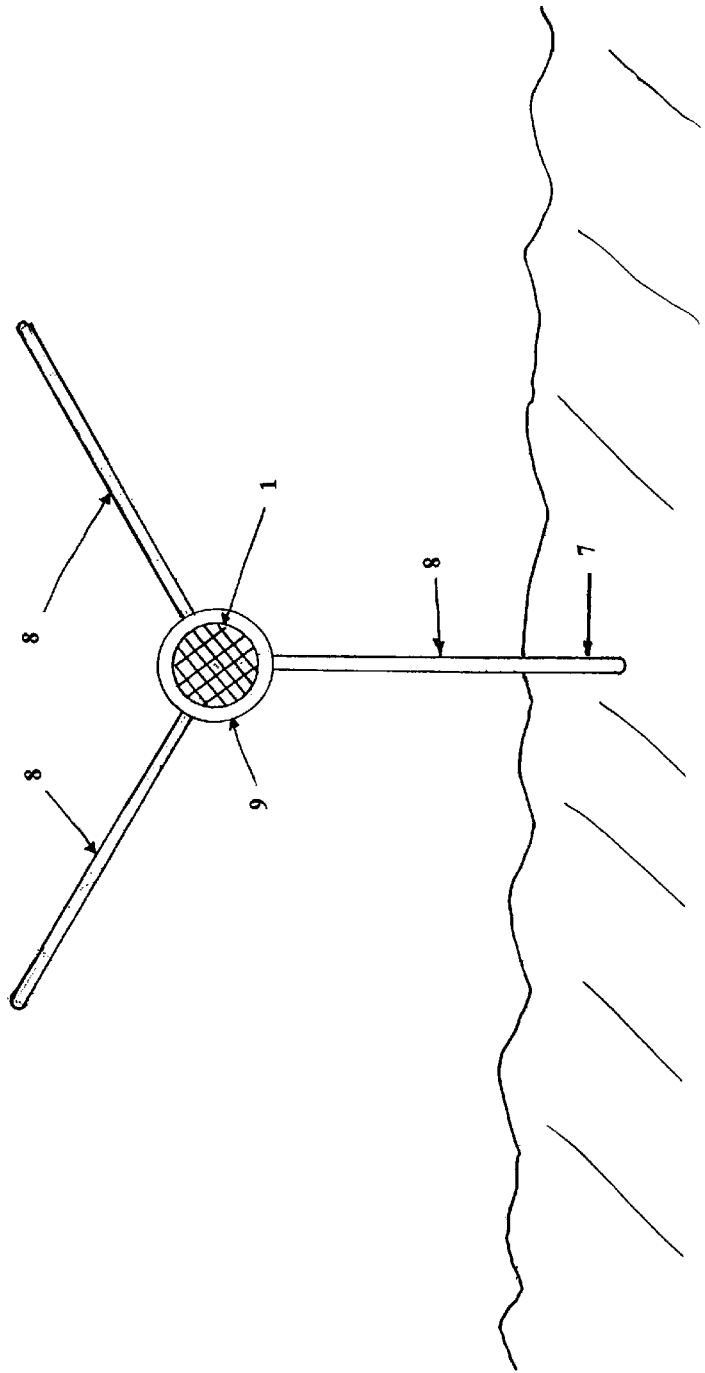

FIG. 2:—Title: "Section A:—Drive Shaft—End View"
Description:—is an end view of the outer end of the power drive shaft (1) and shows the mounted paddles (7) on the shaft (1) protruding into the surface of the water current flow.

Figure 3:
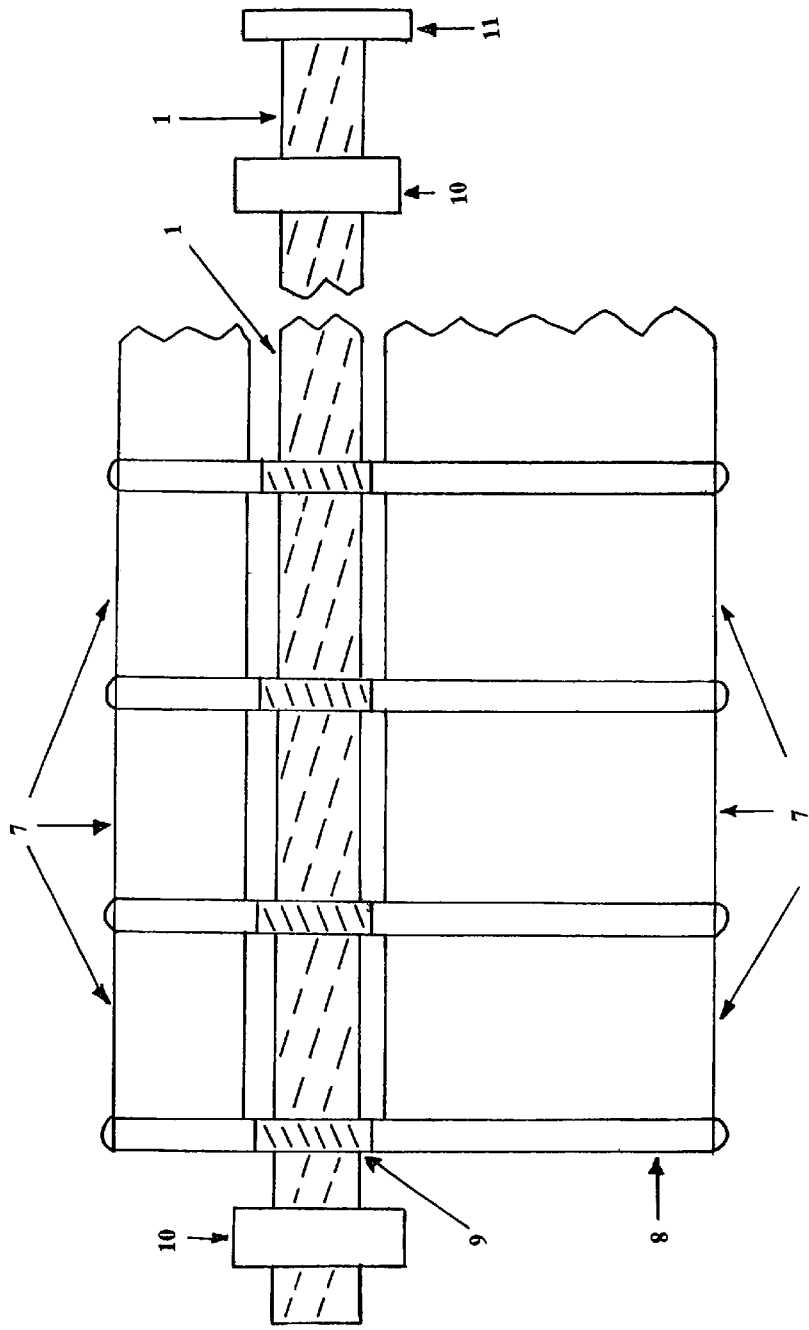

FIG. 3:—Title: "Section A:—Drive Shaft—Side View"
Description:—is a side view of the outer end of the power drive shaft (1) and shows the paddles arms (8) with paddles (7) in mounting collars (9) on the shaft (1) and the shaft bearings (10).

Figure 4:
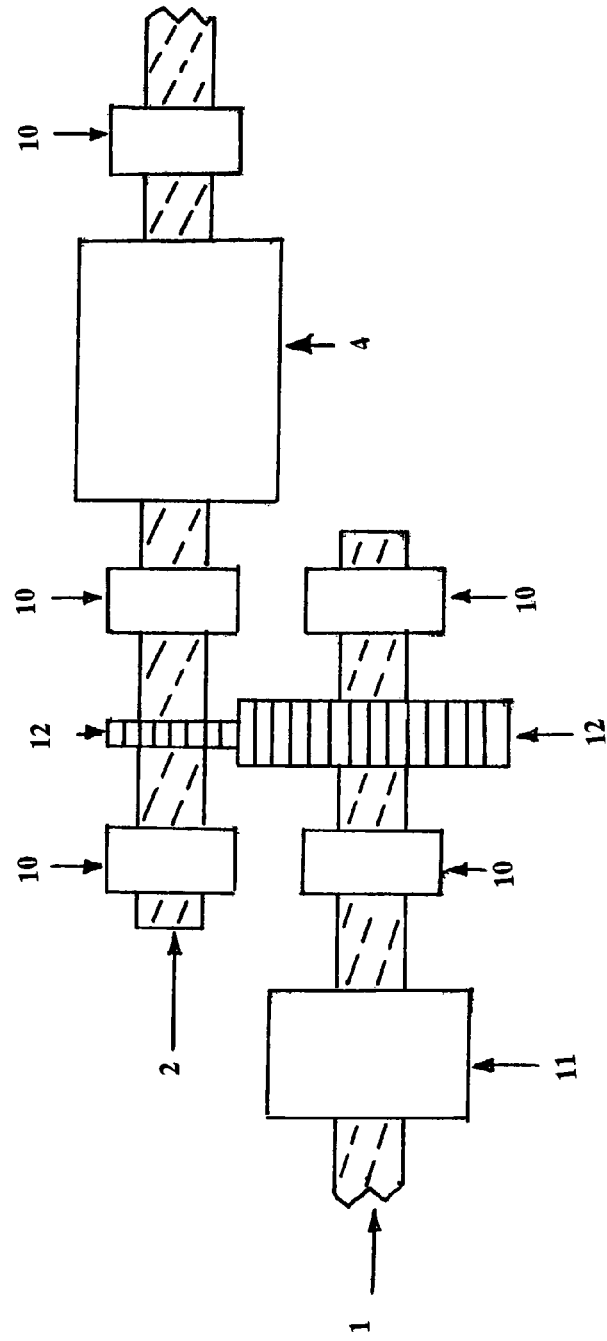

FIG. 4:—Title: "Section B:—Transfer System—Plan View"
Description:—is the transfer system between the power drive shaft (1) and the flywheel shaft (2), the inter connected gears (12), and shows the shafts' disconnect points of, a clutch (11) on the power drive shaft (1) and a transmission (4) on the flywheel shaft (2) along with the shafts' supporting bearings (10).

FIG. 5:—Title: "Section C:—Flywheel—Plan View & Side View"
Description:—is the plan view and the end view of the flywheel (5);
in the plan view it shows the flywheel (5) mounted on the inner end of the flywheel shaft (2) and it's inter connected perimeter gears (12) to a gear (12) on the outer end of the power take off shaft (3) along with the shafts supporting bearings (10).
in the end view it shows the weighs (13) mounted on the outer portion of the flywheel (5) and the flywheel's perimeter gear (12) inter connected to a gear (12) on the outer end of the power take off shaft (3).

FIG. 6:—Title: "Section D:—Power Take Off—Plan View"
Description:—is a plan view of the power take off shaft (3) and shows the inter connected flywheel perimeter gears (12) with a gear (12) on the outer end of the power take off shaft (3), the shaft supporting bearings (10), the shaft disconnect point of a clutch (11) and, the electric generator (6) mounted on the shaft (3) inner end.

Figure 7:
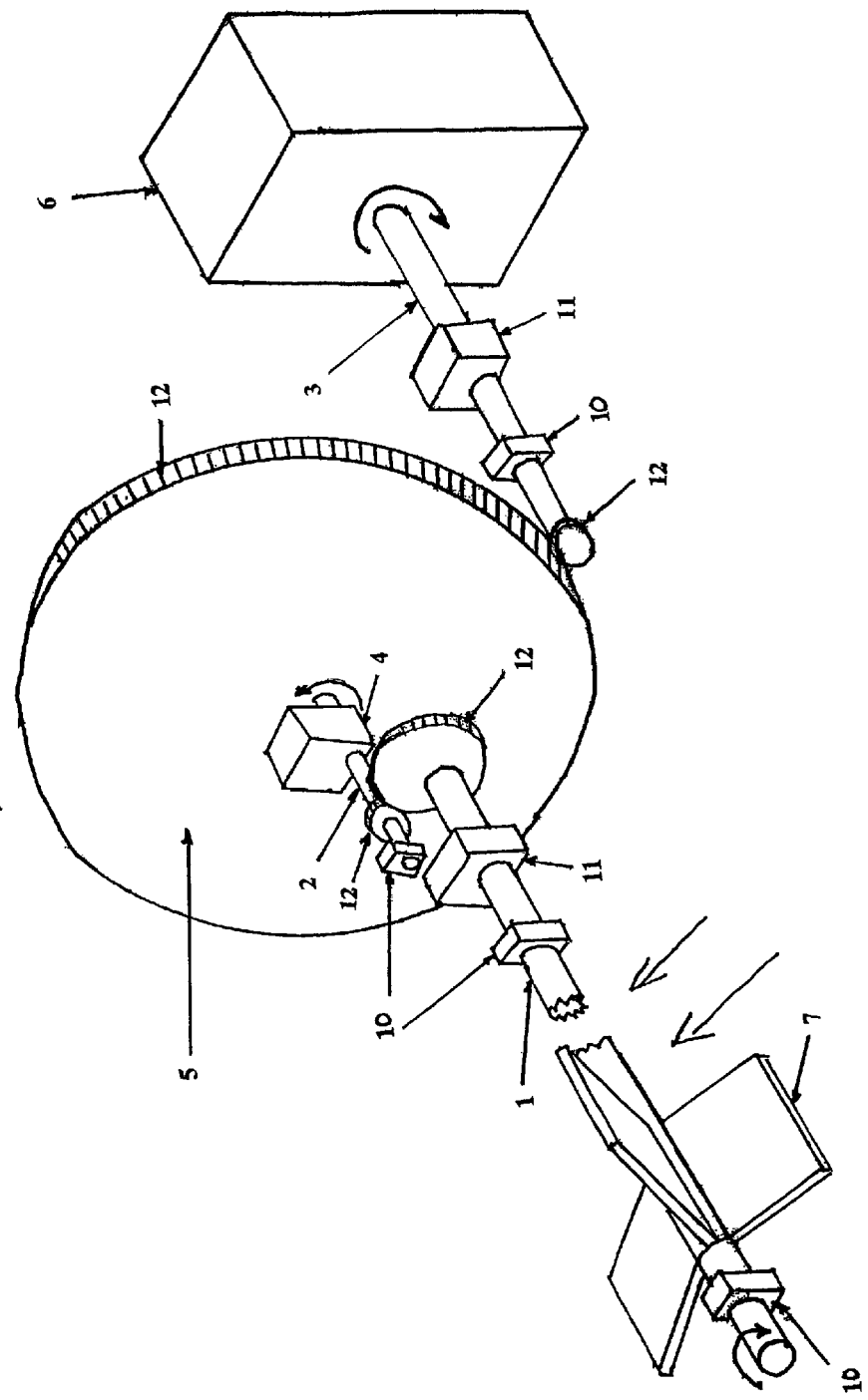

FIG. 7:—Title: "Hydro Torque Electric Generator—Conceptual Diagram"
Description:—is an isometric drawing of the entire apparatus of the Hydro Torque Electric Generator and is a conceptual diagram showing the entire apparatus.

DETAIL DESCRIPTION OF THE INVENTION

The invention is an apparatus consisting of three parallel rotating shafts inter connected by gears (12) and with disconnect points from the outer to inner end on each shaft, that, when installed in a specific sequential method, creates a rotational motion transfer system of the rotational motion captured from a water current flow on the outer end of the power drive shaft (1) to an electric generator (6), generating electricity, on the inner end of a power take off shaft (3).

The first shaft, a power drive shaft (1) outer end is suspended over a water current flow oriented perpendicular to the direction of the current flow with paddles (7) protruding into the water. The shaft's (1) outer end is connected to the inner end by a clutch (11). The shaft (1) inner end is connect to a flywheel shaft (2) by inter connecting gears (12).

The second shaft, a flywheel shaft (2), has a inter connecting gear on it's outer end connecting to a gear (12) on the inner end of the power drive shaft (1). The shaft (2) outer end is connect to the inner end by a transmission (4). The shaft (2) inner end has a flywheel (5) mounted on it with perimeter gears (12) inter connected to a gear (12) on the outer end of a power take off shaft (3).

The third shaft, a power take off shaft (3) has a inter connecting gear (12) on it's outer end connected to the perimeter gears (12) on the flywheel (5) mounted on the inner end of the flywheel shaft (2). The shaft (3) outer end is connected to the inner by a clutch (11). The shaft (3) inner end has an electrical generator (6) for generating electricity.

All three shaft rotate in bearings (10) mounted in any frame structure to support the rotational motion of the shafts. The bearings (10) of the power drive shaft (1) outer end can be mounted in any hanging frame structure over a water current flow.

The engagement of these three shafts, the power drive shaft (1), the flywheel shaft (2), and the power take off shaft (3) rely on the disconnection mechanism on each shaft to transfer the rotational motion of the outer end of the shaft to the inner end. The power drive shaft (1) has paddles (7) mounted on the outer end which protrude into a water flow where the apparatus is mounted capturing the linear motion of the water as it pushes the paddles (7) causing the shaft (1) to rotate. This linear motion of the water flow is used to create the rotational motion on the outer end of the power drive shaft (1). The rotational motion is then amplified by the gear ratio of the inter connecting gears (12) between the power drive shaft (1) and the flywheel shaft (2) when transferred to the flywheel shaft (2). The rotational motion is then incrementally transferred on the flywheel shaft (2) from the outer end to the inner end by a transmission (4) rotating the flywheel (5) with interconnecting perimeter gears (12). The rotational motion is then amplified when transferred by the flywheel perimeter gears (12) inter connected to a gear (12) on the outer end of a power take off shaft (3). The rotation motion is then transferred from the outer end of the power take off shaft (3) to the inner end by a clutch (11) into an electric generator (6), generating electricity.

The Component Parts of the apparatus are as follows:
Three Shafts:
  a power drive shaft (1), a flywheel shaft (2), and a power take off shaft (3).
Shaft Disconnecting Mechanism:
  two clutches (11) and a transmission (4).
Shaft Specific Components:
  on the outer end of power drive shaft (1); paddles (7) mounted on paddle arms (8)
  on inner end of flywheel shaft (2); a flywheel (5)
  on inner end of the power take off shaft (3); an electric generator (6).

A specific sequential method of engagement of the apparatus component parts is required upon installation for the apparatus to operate effectively.

This specific sequential method of engagement of the apparatus' component parts starts with the lowering of the outer end of the power drive shaft (1) with mounted paddles (7) into the water current flow. The support bearings (10) on the power drive shaft (1) can be mounted in hanging frames and lowered slowly into the water current flow. As the paddles (7) protrude into the water the shaft (1) will rotate.

When the outer end of the power drive shaft (1) is fulling engaged, by the engagement of a clutch (11) the rotational motion is transferred to the inner end of the shaft (1). Since the inner end of the power drive shaft (1) is inter connected by a gear (12) to a gear (12) on the outer end of the flywheel shaft (2) once the power drive shaft (1) inner end is engaged the outer end of the flywheel shaft (2) will be engaged, causing the outer end of the flywheel shaft (2) to rotate.

When the outer end of the flywheel shaft (2) is rotating the motion is incrementally transferred to the inner end of the flywheel shaft (2) by a transmission (4).

When the flywheel (5) on the inner end of the flywheel shaft (2) is fully engaged because of the inter connected flywheel perimeter gears (12) to a gear (12) on the outer end of the power take off shaft (3), the outer end of the power take shaft (3) will rotate.

Once the outer end of the power take off shaft (3) is fully engaged the rotational motion is then transferred to the inner end of the shaft (3) by a clutch (11) into an electric generator (6) on the inner end of the power take shaft (3), generating electricity.

| Index of Figures | |
|---|---|
| HYDRO TORQUE ELECTRIC GENERATOR | |
| 1 | Power Drive Shaft |
| 2 | Flywheel Shaft |
| 3 | Power Take Off Shaft |
| 4 | Transmission |
| 5 | Flywheel |
| 6 | Electrical Generator |
| 7 | Paddles |
| 8 | Paddle Arms |
| 9 | Mounting Collars |
| 10 | Bearings |
| 11 | Clutch |
| 12 | Gears |
| 13 | Weights |

I claim:

1. A hydro torque electric generator comprising: a power drive shaft comprising an outer end that protrudes into a water flow, a plurality of paddles mounter on the outer end of the power drive shaft, clutch disconnection point in the middle of the power drive shaft, and a gear wheel mounted on an inner end of the power drive shaft;

a flywheel shaft comprising an inner end, middle and an outer end, said outer end having a gear connecting the gear on the inner end of the power drive shaft, a transmission disconnect point in the middle of the flywheel shaft, and a flywheel mounted in the inner end of the flywheel shaft, said flywheel comprising gears mounted on the periphery of the flywheel;

and a power take off shaft comprising an outer end, a middle and an inner end, a gear mount on said outer end and interconnected with the gears of the flywheel, a clutch disconnect point in the middle of the power take off shaft, and a electrical generator mounted on the inner end of the power take off shaft.

2. A method of installation of the hydro torque electric generator of claim 1 comprising the steps of:
- the outer end of the power drive shaft mounted over a water flow to be lowered into a position with paddles protruding into the water at the surface causing a rotation of the outer end of the power drive shaft;
- the outer end of the power drive shaft is engage in the water current flow, with a first clutch, wherein the rotational motion is transferred to the inner end of the shaft which is inter connected to the outer end of the flywheel shaft by the gears;
- and wherein the rotational motion of the outer end of the flywheel shaft is incrementally transferred to the inner end with the utilization of a transmission turning the flywheel which is inter connected with perimeter gears to a gear on the outer end of the power take off shaft;
- and wherein the rotation motion of the outer end of the power take off is transferred to the inner end of the shaft with the utilization of a second clutch into an electric generator.

* * * * *